United States Patent [19]

Baldacci

[11] 4,189,241
[45] Feb. 19, 1980

[54] ICE-CREAM MAKING MACHINE FOR HOUSEHOLD USE

[76] Inventor: Lapo Baldacci, via lungo l'Affrico, 212, Firenze, Italy

[21] Appl. No.: 911,606

[22] Filed: Jun. 1, 1978

[30] Foreign Application Priority Data

Jun. 23, 1977 [IT] Italy ............................... 3482 A/77
Jan. 10, 1978 [IT] Italy ............................... 3306 A/78

[51] Int. Cl.² ........................................... B01F 7/32
[52] U.S. Cl. ................................ 366/245; 366/297; 366/349
[58] Field of Search ....................... 366/244–246, 366/261, 297–304, 241, 242

[56] References Cited

U.S. PATENT DOCUMENTS 2,850,268  9/1958  Miller et al. ........................ 366/245

FOREIGN PATENT DOCUMENTS 21752 of 1903 United Kingdom .................. 366/297

Primary Examiner—Philip R. Coe
Attorney, Agent, or Firm—Guido Modiano; Albert Josif

[57] ABSTRACT

An ice-cream making machine for household use is described comprising a box-like bracket fixed to a motor and two containers for the mixture to be whisked. The two containers are closed by corresponding removable covers and the bracket pivotally supports gear wheels driven by the motor through drive gears also supported by the bracket and engageable with stirring vane carrying spindles supported by the covers. The spindles are in turn effective to engage with and disengage from the gear wheels as the covers are latched to and released from the containers.

5 Claims, 4 Drawing Figures

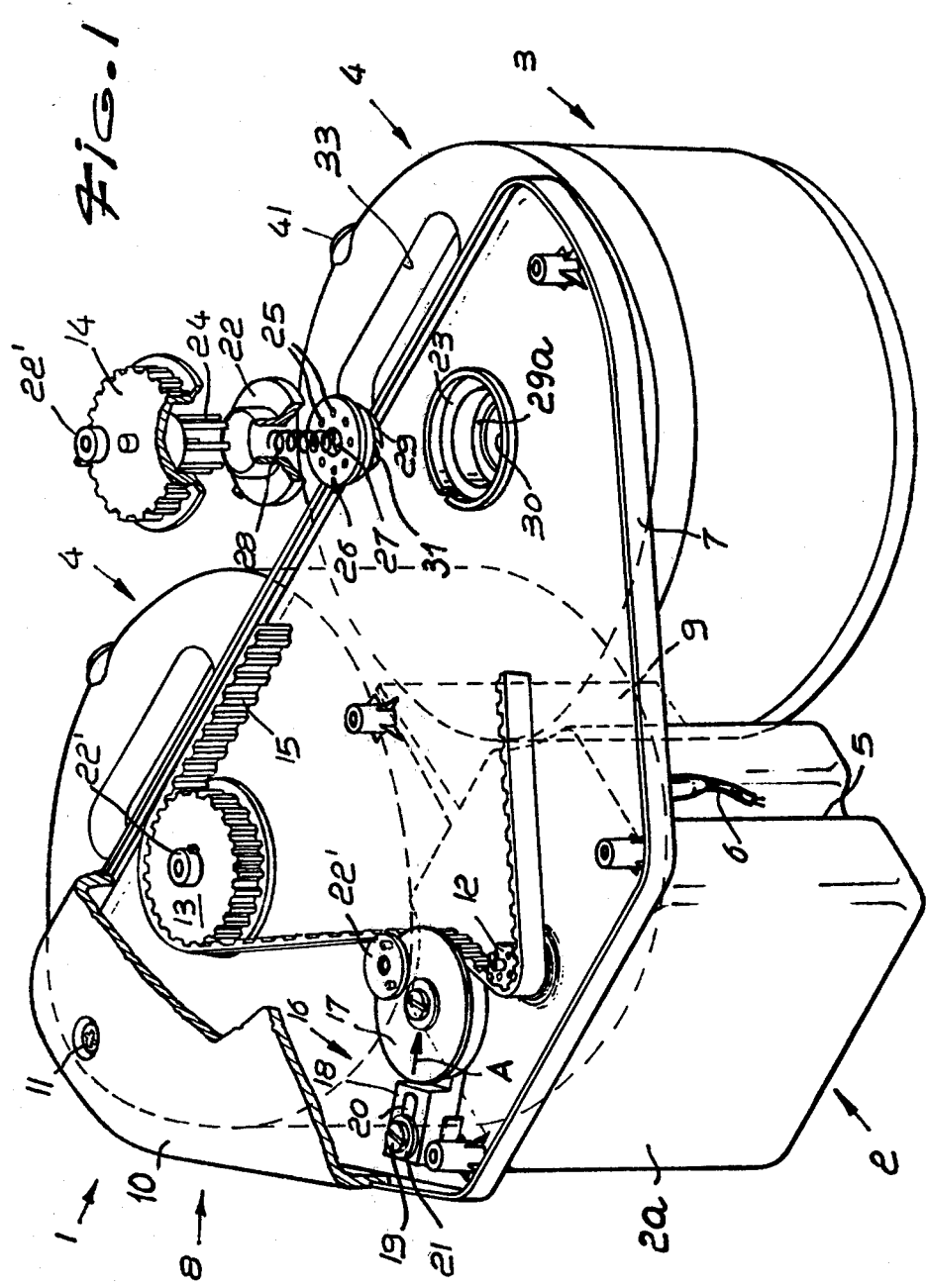

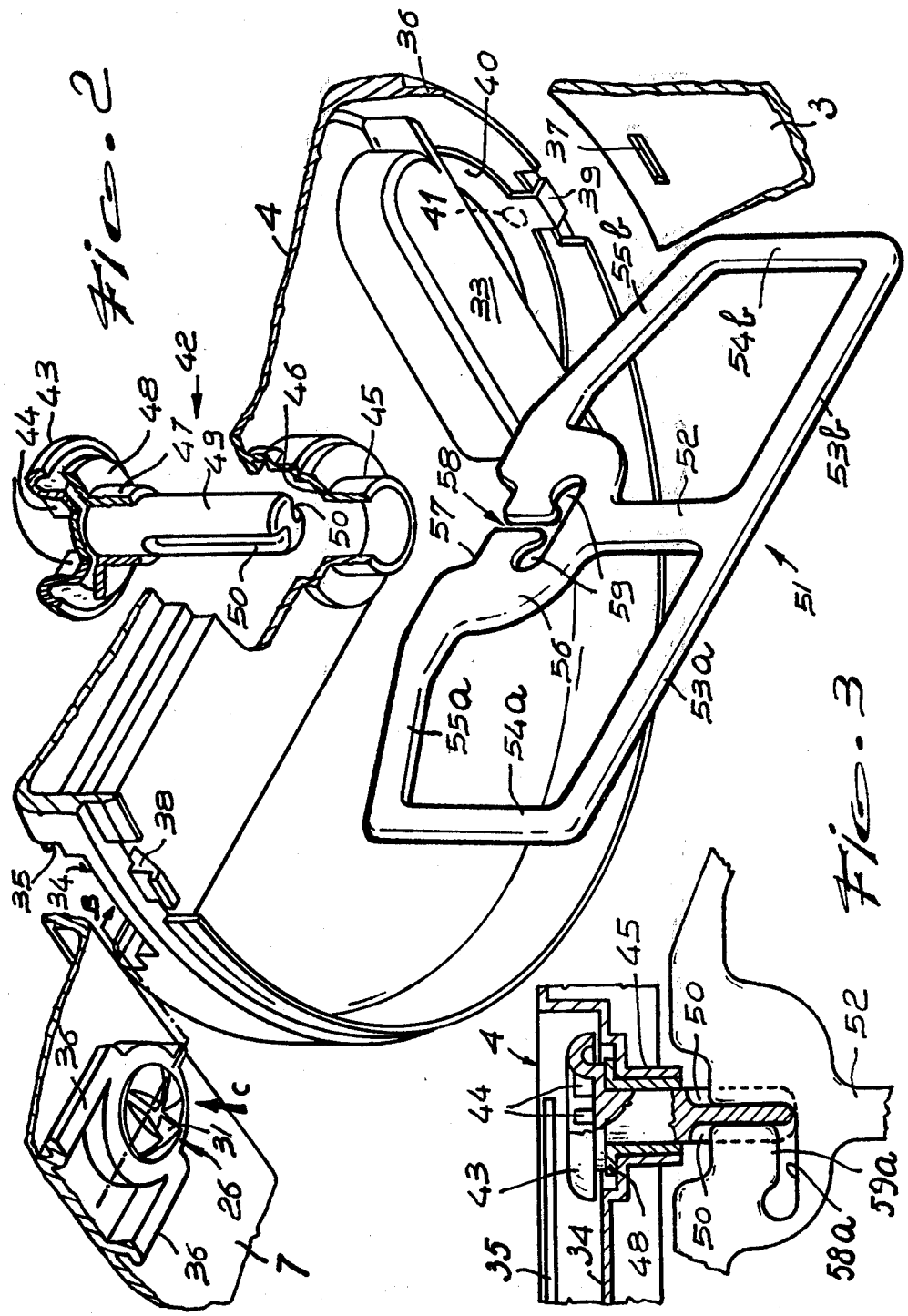

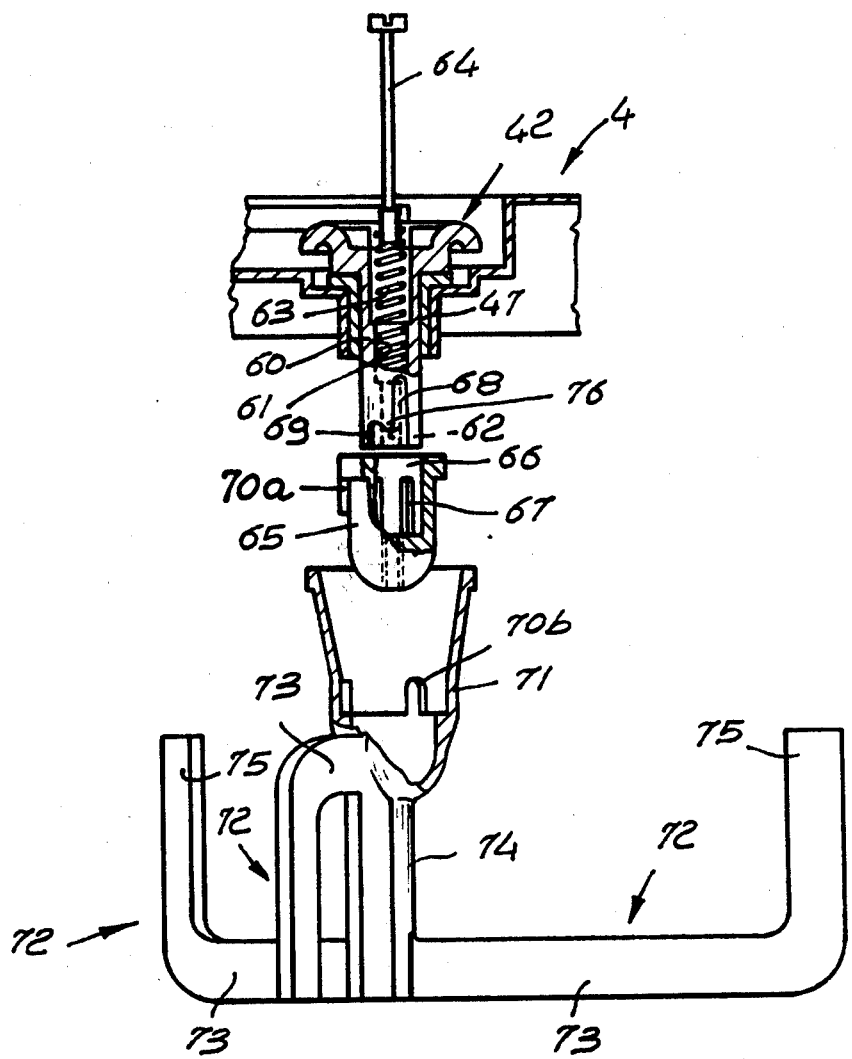

ICE-CREAM MAKING MACHINE FOR HOUSEHOLD USE

BACKGROUND OF THE INVENTION

This invention relates to an ice-cream making machine for household use.

Known in the art are ice-cream making machines for household use comprising one or two containers for containing the mixture to be whisked, and vanes adapted for stirring the mixture which are immersed in the containers and connected drivingly to a motor unit. Such prior art ice-cream making machines, however, have drawbacks which depend essentially on the following factors:

(a) The containers are separated from the motor unit by an axial sliding movement, thereby to remove the containers the whole ice-cream making machine must be removed from the freezer;

(b) The stirring vanes are integral with the motor unit, and in order to clean them fairly complex operations have to be carried out outside of the freezer; and (c) It is inconvenient to whisk several ice-cream flavors, either because the separation of the ice-cream flavors is carried out in an inaccurate manner (e.g. by utilizing an annular partition laid inside the container such as to define two concentrical whisking areas or spaces), or, and particularly with ice-cream making machines having two containers, the vanes remain attached to the motor unit, thus posing the same problems as listed under (a) and (b) above.

SUMMARY OF THE INVENTION

It is the technical task upon which this invention is based to obviate the cited drawbacks, i.e. to provide an ice-cream making machine for household use which affords simultaneous whisking capability for two ice-cream flavors, without involving removal of the motor unit from the freezer whenever it becomes necessary to remove one container for replacement with another container.

This object of the invention is achieved by the instant ice-cream making machine for household use being characterized in that it comprises a box-like bracket fixed cantilever fashion to a motor drive unit and provided with means for latching and releasing at least two covers closing the containers of the mixture to be whisked, said covers being secured to said containers detachably, and in that said bracket pivotally supports at least two gear wheels driven by said unit through drive members, said drive members being carried by said bracket and adapted for coupling, through coupling means, to stirring vane carrying spindles, said spindles being pivotally supported by said covers, said coupling means allowing said gear wheels to be coupled to and decoupled from said spindles during the cover latching and releasing steps.

BRIEF DESCRIPTION OF THE DRAWINGS

Further features of the invention will become apparent from the following description and accompanying drawings, where:

FIG. 1 is a partly cut-away perspective view of an ice-cream making machine according to the invention;

FIG. 2 is an exploded, partly cut away, perspective view of a cover and related stirring vane;

FIG. 3 is a sectional view, taken along a vertical plane, of a stirring vane attachment area, according to a first embodiment of this invention; and FIG. 4 is a sectional view, also taken along a vertical plane, of that attachment area, but according to a second embodiment.

DESCRIPTION OF THE PREFERRED EMBODIMENTS

In FIGS. 1 and 2 of the drawings, the instant ice-cream making machine is generally indicated at 1, and comprises a motor drive unit 2, two containers 3 for the mixture to be whisked, and covers 4 for closing such containers. The unit 2 is enclosed in a housing 2a of prismatical shape which is formed with two vertical grooves 5 on opposed sides.

The unit 2 includes an electric motor which is connected to a supply by means of a small cable 6 exiting the lower half shell of a box-like bracket 8 rigidly mounted in cantilever or jutting relationship to the unit 2 and having a rounded corner trapezium configuration.

As the ice-cream making machine is introduced in a freezer, the cable 6 is led outside of the freezer, the closing of the freezer door being allowed by the deformability of the sealing gasket attached to the door periphery.

The lower half shell 7 of the bracket is integral with the housing 2a, which is located at the shorter side of the bracket, and from which a vertical wing extends to increase the resting surface and support the bracket 8 from below. To the half shell 7 of the bracket, there is attached an upper or top half shell 10 by means of screw fasteners 11. Thus, there is defined between the half shells 7 and 10 a compartment for accomodating a pinion gear 12 and two gear wheels 13, 14 having their axes vertical. Around the pinion gear and gear wheels, a cogged drive belt 15 is passed in closed loop arrangement, whereon a tensioning device 16 is active which comprises a wheel 17 mounted idly on an arm 18 which can be adjusted along a direction A perpendicular to the belt run extending from the pinion 12 to the wheel 13. The arm 18 may be locked to the half shell 7 by means of a screw 19 engaging a longitudinal slot 20 in the arm 18, with the interposition of a washer 21.

The pinion gear 12 and gear wheels 13,14 are preferably of a plastic material and supported each by a pair of plain bearings 22', also made of plastics, which are received in seats 23 of the half shells 7 and 10. The upper bearings 22' (of which those related to the pinion 12 and wheel 14 are shown raised from the pinion and wheel in FIG. 2 ) are smaller than the lower ones 22.

From each gear wheel 13,14 there extend downwards several axial pins 24 which are angularly distributed along a concentric circumference to the rotation axes of the wheels 13,14 and inserted through holes 25 in respective couplings 26 such as to be slidable axially. Each coupling has at its center a blind hole 27 adapted for accomodating a compressive coil spring 28 acting between the coupling and respective gear wheel.

The couplings 26 comprise a flange 29 adapted for resting on a lip 29a surrounding an opening 30 in the lower half shell 7, and a substantially frustum-like end formed with four radial notches which define sawteeth 31 projecting below the half shell 7.

The containers 3 are of flattened cylindrical configuration and closed by respective covers or lids 4, at the top whereof radial channels 34 are formed which have opposed grooves 35 on their sides for sliding engagement with parallel extending ridges 36, formed under the half shell 7 and tangent to the opening 30. The cover 4 is latched to the container 3 by inserting the edge 36a of the cover into the container and engaging, in seats 37 arranged at diametrically opposed locations in the cover, a fixed tooth 38 and movable tooth 39 of the cover. The tooth 39 is biassed to the outside by an elastic reed 40 which can be operated by means of a pushbutton 41, in the sense that on depressing the pushbutton 41 the tooth 39 becomes disengaged from the seat 37, thus permitting the container to be removed from its cover. The tooth 39, reed 40, and pushbutton 41 are a single piece, and the reed 40 is received in a space enclosed between the peripheral edge of the cover 4 and a recess 33 formed in the cover to allow engagement with the hand of the operator during the removal of the cover from the bracket.

The radial channels 34 extend to the center of the respective covers, whereat spindles or pins 42 are mounted idly, which carry at their top ends toric rings 43 having four radial wings 44 which project inwards. As a container is installed under the bracket 8 (by a sliding movement in the direction of the arrowhead B of the ridges 36 along the grooves 35), the couplings 26 first abut on the rings 43 and are raised in the direction of the arrowhead C against the spring 28 to then engage with the teeth 31 between the wings 44, thus providing a rotary coupling of the gear wheels 13,14 with the respective spindles 42.

The pivotal mount for the spindles 42 in the covers is obtained by the interposition of plain bearings 47 which are superimposed on the stem 49 of the spindles and received in bushings 45 which project downwards from the lower half shell 7.

A flat annular area 46 is formed around the bushings 45 for supporting a flange 48 of the bearings 47. The bearings 47 (similar to the cited bearings 22) are provided with outer projections or lugs adapted for engagement in notches of the half shells 7,10 to prevent the latter from being entrained rotatively.

The stems 49 have two diametrically opposed longitudinal grooves 50 for attachment of the stirring vanes. The ice-cream stirring vane or paddle is indicated generally at 51 and is of flattened shape. It can be obtained by a molding process from a plastic material exhibiting adequate strength and elasticity. The vane 51 comprises a vertical middle portion 52, two lower radial ribs 53a and 53b aligned with each other, two vertical end portions 54a, 54b, and two upper ribs 55a, 55b which raise to the portion 52 and are connected thereto with a central portion 56 having at the top a recess 57 adapted for clearing the bushing 45. The recess 57 extends axially downwards with a notch 58 shaped like an inverted "T", wherein the stem 49 can be inserted from above. The notch 58 defines two tabs 59 which engage the grooves 50, thus providing a rotary coupling for the vane 51. The stem 49 is slightly force fit between the tabs 59 such as to retain the vane.

In the example shown in FIG. 3, provision is made for an L-like notch 58a which forms a single tab 59a.

With the grooves 50 of the stem 49 and tabs 59 a torque limiter is obtained for automatically releasing the vane from the spindle 42 as the whisked mixture reaches a given consistency and the resisting moment applied to the vane causes the tabs 59 to be deformed such as to release them from the grooves 50 to cause the the vane 51 to detach from the spindle 52.

In the embodiment of FIG. 4, the automatic release of the vanes from the spindles is achieved in the following manner. In the bushing 45 of the cover 4 there is mounted, with the interposition of a bearing 47, the spindle 42 having a stem 60 which has an axial hole 61 which is formed with a narrow neck portion 62 at an intermediate area. The hole 61 accomodates a compressive coil spring 63 through which is passed a screw 64 threaded in an element 65 substantially configurated as an inverted bell. In FIG. 4, the screw 64 is shown in a withdrawn position for clarity. The element 65 is provided at the top with a recess 66 in which at least one longitudinal ridge 67 projects radially the top whereof is adapted for engagement in either of a pair of adjacent notches 68,69 having different axial length and being formed in the end portion of the stem 60.

The element 65 is provided externally with a series of radial teeth 70a which are adapted for engagement between the inner radial teeth 70b of an upwardly flared case 71. From the case 71, there project spider-like or star-like contoured vanes which comprise three radial arms extending from a central stem 74, rigidly mounted at the bottom to the case 71, and terminating in portions 75 orientated vertically upwards and downwards.

The above torque limiter operates as follows. The bell shaped element 65 is positioned such that the ridge 67 rests with its upper end on the notch 69. Then the set of vanes 72 is placed into the container 3, said vanes aligning the case with the container axis on account of their being arranged star-like. In this condition, the cover or lid can be pressed onto the container and latched thereto, the element 65 positively entering the case 71 with the teeth 70a intervening between the teeth 70b. As the spindle 42 is rotated, and upon the resisting moment exceeding the predetermined limit value, the top of the ridge 67 moves past, overcoming the spring 63, a ridge 76 provided between the notches 68 and 69, thereby the ridge 67 is enabled to penetrate the notch 68 and cause the element 65 to be raised and the spindle 62 to be disengaged from the vanes or paddles 72.

It will be appreciated that, in the ice-cream making machine described hereinabove, the ice-cream containers, and related covers and vanes, can be separated from the motor unit even without stopping the motor and removing it from the freezer. In this manner, it becomes possible to prepare ice-creams in different flavors, for example by withdrawing from the ice-cream making machine a ready ice-cream container and replacing it with another container containing ice-cream yet to be whisked, while the whisking process is continued in the other container which remains connected to the motor.

The cleaning of the components in actual contact with the ice-cream (containers, vanes and covers) is easily carried out because such components may be quickly and easily disassembled and removed from the electric portion of the machine.

I claim:

1. An ice-cream making machine for household use, comprising a motor drive unit, a box like bracket mounted on said unit and having a portion projecting in cantilever fashion therefrom, a gearing arranged in said bracket and including a pair of gear wheels rotatably supported in said bracket portion and provided with coupling means projecting out of said bracket portion, a pair of cylindrical containers for the mixture to be whisked, a pair of covers each closing a respective of said containers, spindle elements each rotatably supported at the center of said covers and having means for rotative engagement with said coupling means, stirrer elements rotatably connected on said spindle elements and projecting inside said containers and means for detachably supporting each of said covers under said bracket portion in position in which said coupling means are in rotative engagement with respective spindle elements, said coupling means being disengageable from the spindle elements during lateral removal of the covers.

2. An ice-cream making machine as claimed in claim 1, in which said means for detachably supporting said covers comprises a channel radially extending from the center of each of said covers and open upwards and outwards, grooves formed in said channel and ridges formed under said cantilever bracket portion for sliding engagement with said grooves.

3. An ice-cream making machine as claimed in claim 2, in which each coupling means comprises a tapered end portion rotatably rigid and axially slidable with respect to the respective gear wheel, a plurality of teeth formed in said end portion and a spring arranged between said coupling means and said gear wheel for holding said tapered portion projecting out downwards from said cantilever bracket portion.

4. An ice-cream making machine as claimed in claim 3, wherein said means for rotative engagement of said spindle with coupling means comprises a ring formed at an end of the spindle projecting out of the covers, a plurality of wings radially extending inwardly from said ring, said ring during application and removal of the covers under the bracket portion being urged against said tapered end thus causing axial displacement of the coupling means to bring said teeth in or out of engagement with said wings.

5. An ice-cream making machine as claimed in claim 4, comprising a torque limiter arranged between a stirrer element and a respective spindle, said torque limiter comprising two grooves longitudinally formed in the spindle at diametrically opposite position, a notch formed in the stirrer element and defining two opposite tabs, said spindle being insertable in said notch, such that said tabs elastically engage said grooves and come out therefrom as the resisting moment applied to said stirrer elements exceeds a predetermined value.

* * * * *